US009429795B2

(12) United States Patent
Chung et al.

(10) Patent No.: US 9,429,795 B2
(45) Date of Patent: Aug. 30, 2016

(54) DISPLAY PANEL HAVING PARTICULAR SPACER ARRANGEMENT

(71) Applicant: AU Optronics Corp., Hsin-Chu (TW)

(72) Inventors: Yuan-Chun Chung, Hsin-Chu (TW); Yen-Huang Hsu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 57 days.

(21) Appl. No.: 14/623,516

(22) Filed: Feb. 17, 2015

(65) Prior Publication Data

US 2015/0293394 A1 Oct. 15, 2015

(30) Foreign Application Priority Data

Apr. 9, 2014 (TW) ............................ 103113083 A

(51) Int. Cl.
*G02F 1/1339* (2006.01)
*G02F 1/1333* (2006.01)
*G02F 1/1343* (2006.01)
*G02F 1/1337* (2006.01)

(52) U.S. Cl.
CPC ..... *G02F 1/13394* (2013.01); *G02F 1/133784* (2013.01)

(58) Field of Classification Search
CPC ........... G02F 1/13394; G02F 1/13392; G02F 1/133512; G02F 1/1339; G02F 1/134363; G02F 1/136209; G02F 2001/133388; G02F 1/133707; G02F 1/136213; G02F 1/1393; G02F 2001/133742
USPC ................................ 349/155, 110, 141, 130
See application file for complete search history.

(56) References Cited

U.S. PATENT DOCUMENTS 8,643,819 B2 * 2/2014 Yamamoto ........ G02F 1/133514 349/106
2014/0168554 A1 * 6/2014 Son .................. G02F 1/134336 349/43

FOREIGN PATENT DOCUMENTS

JP 2011170078 9/2011
TW 200919536 5/2009

* cited by examiner

*Primary Examiner* — Mike Qi
(74) *Attorney, Agent, or Firm* — WPAT, PC; Justin King

(57) ABSTRACT

A display panel includes a pixel array, a light-shielding pattern and a plurality of spacers. The pixel array includes a plurality of sub-pixels. The light-shielding pattern has a first edge and a second edge disposed adjacent to two neighboring sub-pixels, respectively, and a width H exists between the first edge and the second edge. The spacers overlap the light-shielding pattern in a vertical projection direction, and each spacer has a diameter D. Each spacer has a first rim facing the first edge and a second rim facing the second edge. The first rim and the first edge have a first distance A", the second rim and the second edge have a second distance B". The width H between the first edge and the second edge, the diameter D of the spacer, the first distance A" and the second distance B" satisfy the following relations: B">0; A"≥0; B">A"; and 2D≤H≤3D.

12 Claims, 10 Drawing Sheets

DISPLAY PANEL HAVING PARTICULAR SPACER ARRANGEMENT

BACKGROUND OF THE INVENTION

1. Field of the Invention

The present invention relates to a display panel, and more particularly, to a display panel with high contrast ratio.

2. Description of the Prior Art

Due to its advantages such as compact size and energy efficiency, liquid crystal display (LCD) panel has been widely used in various types of electronic products such as smart phone, notebook computer, tablet PC and TV. The LCD panel includes a first substrate e.g. an array substrate, a second substrate e.g. a counter substrate, and a liquid crystal layer interposed between the first substrate and the second substrate. In addition, the LCD panel further includes a plurality of main spacers disposed between the first substrate and the second substrate to maintain a constant cell gap. The main spacers are formed on one of the first substrate or the second substrate in advance, and the main spacers will be in contact with the other one of the first substrate and the second substrate to maintain the cell gap after they are assembled. In addition, the LCD panel includes two alignment films disposed on the inner surfaces of the first substrate and the second substrate respectively. The alignment film is used to align liquid crystal molecules, and the aligning effect of the alignment film is achieved by a rubbing alignment process. The existence of the main spacer, however, impedes the rubbing alignment process on the alignment film, which causes light leakage in the proximity to the main spacer.

SUMMARY OF THE INVENTION

It is therefore one of the objectives of the present invention to provide a display panel with high contrast ratio and low dark state brightness.

In an embodiment of the present invention, a display panel is provided. The display panel includes a pixel array, a light-shielding pattern and a plurality of spacers. The pixel array includes a plurality of sub-pixels, wherein the sub-pixels are substantially arranged along a first direction to form a plurality of sub-pixel rows, and substantially arranged along a second direction to form a plurality of sub-pixel columns. The light-shielding pattern is disposed between any two adjacent sub-pixel rows, wherein the light-shielding pattern has a first edge and a second edge, the first edge and the second edge are disposed adjoining to the two adjacent sub-pixel rows respectively, and a width H exists between the first edge and the second edge in the second direction. The spacers are disposed between the two adjacent sub-pixel rows, the spacers overlap the light-shielding pattern in a vertical projection direction, wherein each of the spacers has a diameter D, each of the spacers has a first rim facing the first edge and a second rim facing the second edge, a first distance A" exists between the first rim and the first edge, a second distance B" exists between the second rim and the second edge, and the width H, the diameter D, the first distance A" and the second distance B" satisfy the following relations:

$$B''>0;$$

$$A''\geq 0;$$

$$B''>A''; \text{ and}$$

$$2D\leq H\leq 3D.$$

The spacer of the display panel of the present invention has shifting design, which can reduce the dark state brightness and increase the contrast ratio without reducing the aperture ratio and increasing the area of the light-shielding pattern.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to the skilled users in the technology of the present invention, preferred embodiments will be detailed as follows. The preferred embodiments of the present invention are illustrated in the accompanying drawings with numbered elements to elaborate the contents and effects to be achieved.

Figure 1:
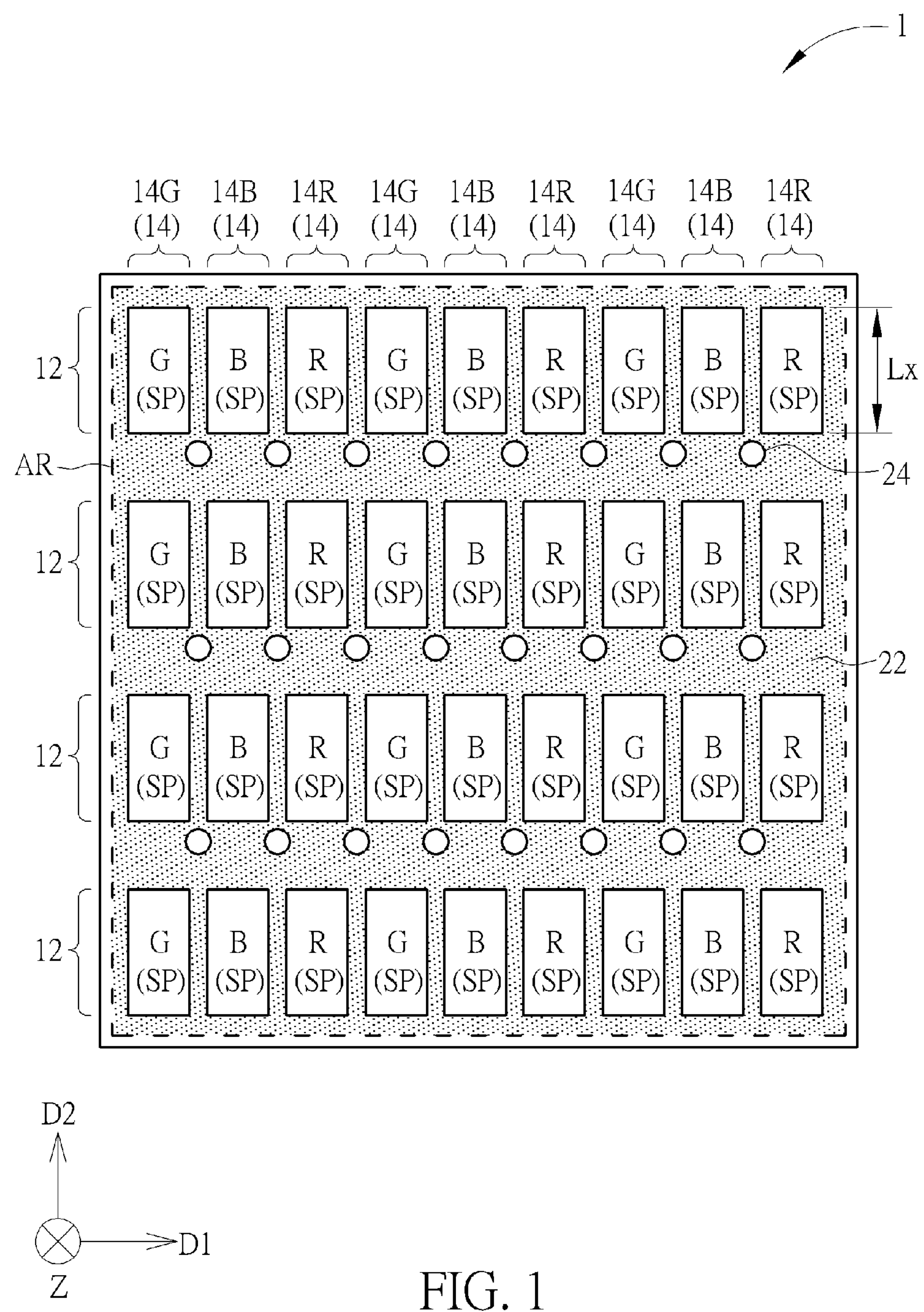
FIG. 1 is a schematic diagram illustrating a display panel according to a first embodiment of the present invention.
Figure 2:
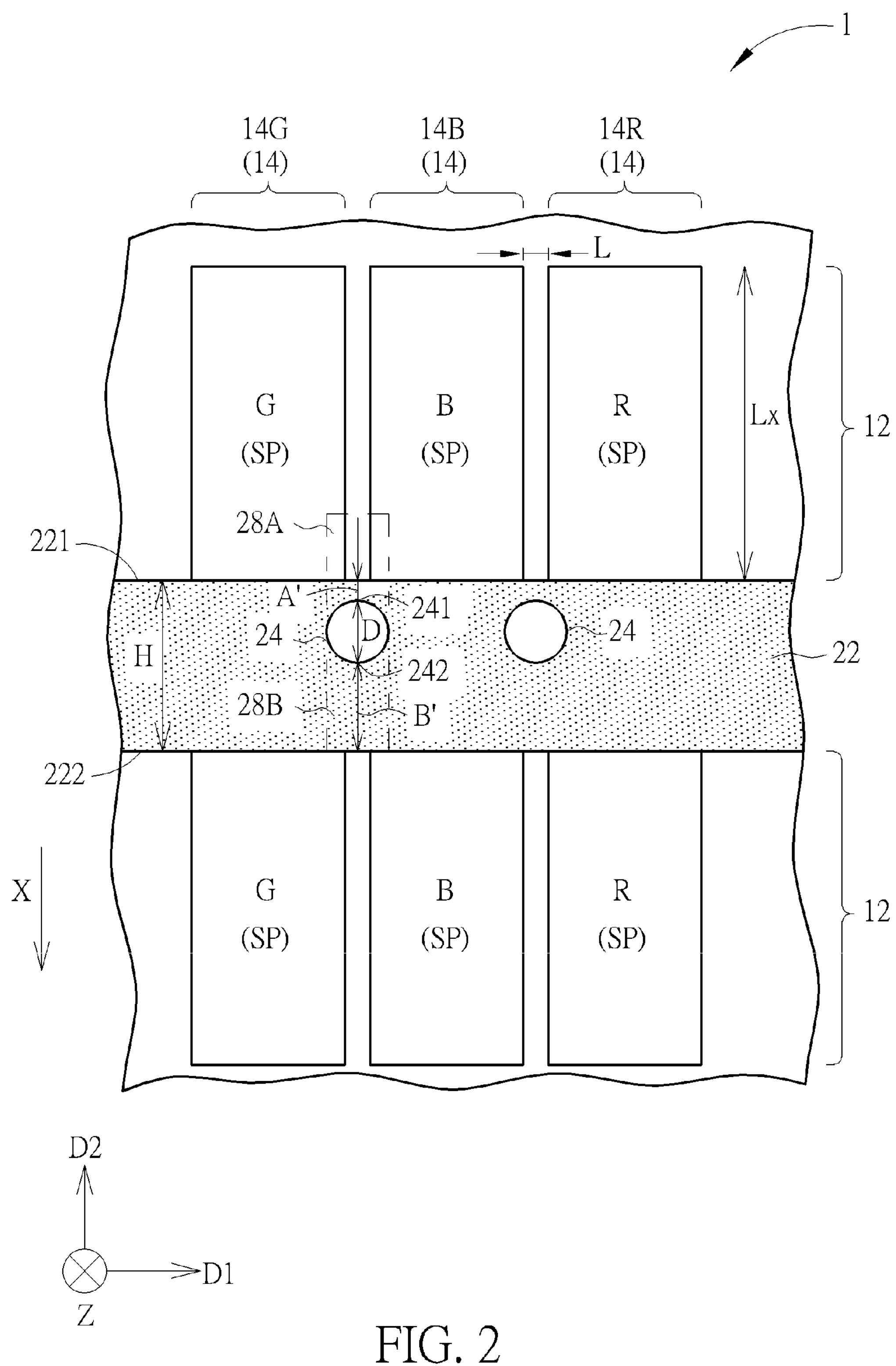
FIG. 2 is a partially enlarged view of the display panel of FIG. 1.
Figure 3:
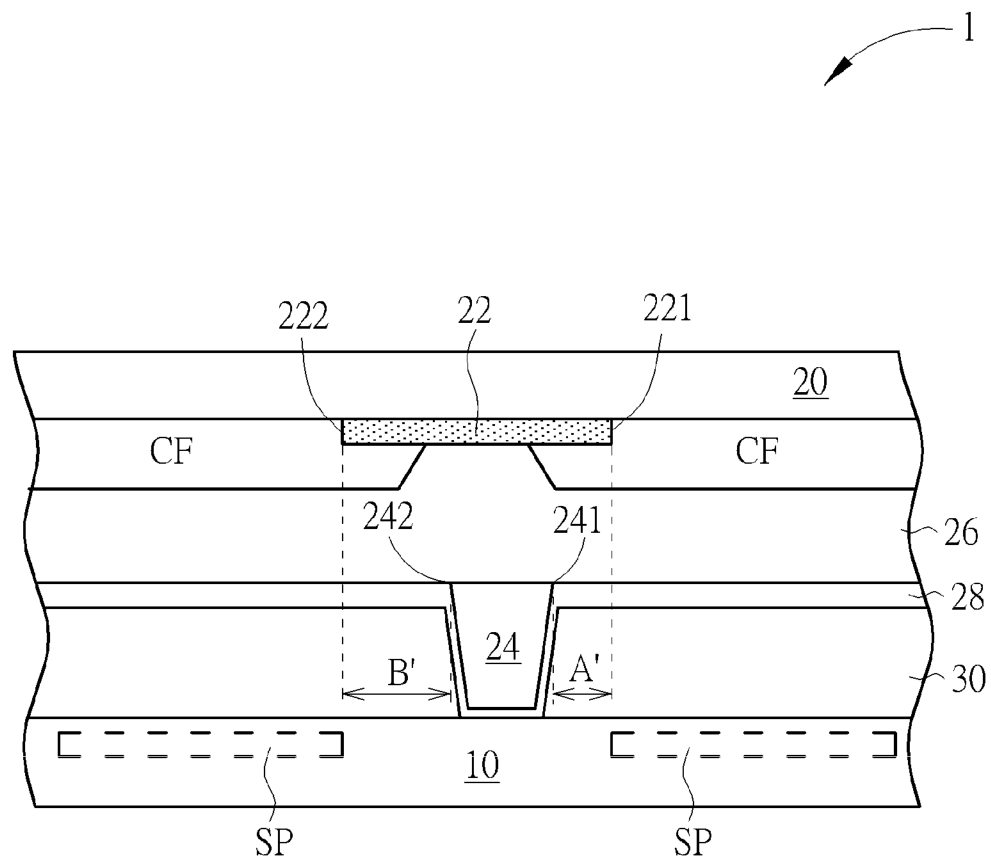
FIG. 3 is a cross-sectional view of the display panel according to the first embodiment of the present invention.

Refer to FIGS. 1-3. FIG. 1 is a schematic diagram illustrating a display panel according to a first embodiment of the present invention, FIG. 2 is a partially enlarged view of the display panel of FIG. 1, and FIG. 3 is a cross-sectional view of the display panel according to the first embodiment of the present invention, where some components are not drawn in all of the drawings for highlighting the features of the display panel. As shown in FIGS. 1-3, the display panel 1 of this embodiment includes a first substrate 10, a second substrate 20, a pixel array AR, a light-shielding pattern 22 and a plurality of spacers 24. The first substrate 10 and the second substrate 20 are disposed opposite to each other, and the first substrate 10 and the second substrate 20 may respectively be a transparent substrate e.g. a glass substrate, a quartz substrate, a plastic substrate or another suitable rigid or flexible substrate. A display medium layer 30 is interposed between the first substrate 10 and the second substrate 20. In this embodiment, a liquid crystal display (LCD) panel is selected as an example of the display panel 1, and thus the display medium layer 30 is a liquid crystal layer. The LCD panel may be an in-plane electric field type LCD panel e.g. a fringe field switching (FFS) LCD panel or an in-plane switching (IPS) LCD panel, but not limited thereto. The LCD panel may be other types of LCD panels e.g. a vertical electric field type LCD panel, or other types of display panels e.g. an electroluminescent (EL) display panel. The pixel array AR is disposed on the first substrate 10, and the pixel array AR includes a plurality of sub-pixels SP. The sub-pixels SP are substantially arranged along a first direction D1 to form a plurality of sub-pixel rows 12, and substantially arranged along a second direction D2 to form a plurality of sub-pixel columns 14. In this embodiment, the first direction D1 and the second direction D2 are substantially perpendicularly to each other, for example, the first direction D1 is the latitudinal direction in FIG. 1, and the second direction D2 is the longitudinal direction in FIG. 1, but not limited thereto. In this embodiment, each of the sub-pixels SP is substantially a rectangular sub-pixel, which has a long axis Lx, and the long axes Lx of all the sub-pixels SP are directed to the same direction e.g. the second direction D2, but not limited thereto. The long axes Lx of all the sub-pixels SP may be directed to different directions. In an alternative embodiment, the long axis Lx of each of the sub-pixels SP belonging to the odd rows of the sub-pixel rows 12 and the long axis Lx of each of the sub-pixels SP belonging to the even rows of the sub-pixel rows 12 are arranged in a non-parallel manner so as to provide wide viewing angle display effect.

Each sub-pixel SP may further include other devices configured to fulfill display function including a switching device e.g. a thin film transistor (TFT) device, a storage capacitor device, electrodes e.g. a pixel electrode and/or a common electrode. The first substrate 10 may be overlaid with various types of signal lines e.g. gate lines (scanning lines), data lines and common lines to provide different driving signals to the sub-pixel SP. In this embodiment, the sub-pixels SP may include sub-pixels configured to provide different colors e.g. green sub-pixels G, blue sub-pixels B and red sub-pixels R. The green sub-pixels G, the blue sub-pixels B and the red sub-pixels R may be alternately and repeatedly arranged in the first direction D1, i.e. the sub-pixel columns 14 may include a plurality of green sub-pixel columns 14G, a plurality of blue sub-pixel columns 14B and a plurality of red sub-pixel columns 14R arranged alternately, but not limited thereto.

When viewing form a vertical projection direction Z, the light-shielding pattern 22 is disposed between any two adjacent sub-pixel rows 12, and the light-shielding pattern 22 extends along the first direction D1. The light-shielding pattern 22 has a first edge 221 and a second edge 222, and the first edge 221 and the second edge 222 are disposed adjoining to two sub-pixel rows 12 disposed adjacently in the second direction D2 respectively. In addition, the light-shielding pattern 22 may be further disposed between any two adjacent sub-pixel columns 14, and the light-shielding pattern 22 may extend along the second direction D2 to form a light-shielding grid. A width H exists between the first edge 221 and the second edge 222 in the second direction D2, which is equal to the distance between the first edge 221 and the second edge 222. In this embodiment, the light-shielding pattern 22 is disposed on the second substrate 20. The light-shielding pattern 22 may be, for example, a black matrix (BM) pattern made of organic material e.g. black photoresist material or inorganic material e.g. metal. In an alternative embodiment, the light-shielding pattern 22 may be disposed on the first substrate 10, and the material of the light-shielding pattern 22 may be organic material e.g. black photoresist material or inorganic material e.g. metal. The display panel 1 may further optionally include other films such as a color filter pattern CF, a planarization layer 26 and an alignment film 28 disposed on the second substrate 20. In this embodiment, the spacers 24 may be main spacers and/or sub spacers. The main spacers are in contact with the first substrate 10 and the second substrate 20, or in contact with the overlying layer of the first substrate 10 and the overlying layer of the second substrate 20 when the display panel 1 is on a normal condition (i.e. when the display panel 1 is not pressed or deformed) to maintain a constant cell gap between the first substrate 10 and the second substrate 20. The sub spacers are not in contact with the first substrate 10 or not in contact with the overlying layer of the first substrate 10 when the display panel 1 is on a normal condition (i.e. when the display panel 1 is not pressed or deformed). When the display panel 1 is pressed by an external force, the sub spacers will be in contact with the first substrate 10 or in contact with the overlying layer of the first substrate 10 to prevent the display panel 1 from being deformed excessively and damaged. The spacers 24 of this embodiment are preferably sub spacers because the number of the sub spacers is usually more than the number of the main spacers. In such a case, the effect for inhibiting dark state light leakage is more significant. Since the dark state light leakage is inhibited, the contrast ratio is increased and the dark state brightness is decrease (i.e. the dark image is blacker). The spacers 24 are not limited to be sub spacers. In an alternative embodiment, the spacers 24 may be main spacers. In still another alternative embodiment, some of the spacers 24 may be main spacers, while the other spacers 24 may be sub spacers. In addition, the numbers, arrangement densities and locations of the main spacers and the sub spacers may be modified. For example, the spacer 24 may be disposed among any four adjoining sub-pixels SP, or disposed among a portion of four adjoining sub-pixels SP.

When viewing form a vertical projection direction Z, the spacers 24 are disposed between two adjacent sub-pixel rows 12, and the spacers 24 overlap the light-shielding pattern 22. In this embodiment, the spacers 24 are disposed on the second substrate 20, but not limited thereto. The spacer 24 may be substantially a cylinder structure, a cone structure or other structures. In the second direction D2, each of the spacers 24 has a diameter D. In this embodiment, the spacers 24 are disposed between the planarization layer 26 and the alignment film 28, i.e. the alignment film 28 is disposed on the spacer 24 and covers the surface of the spacer 24 and the surface of the planarization layer 26. The diameter D is the maximum diameter of the spacer 24 in the second direction D. For example, if the spacer 24 is a cylinder structure or a cone structure, the diameter D is the diameter of the round base of the spacer 24.

Figure 4:
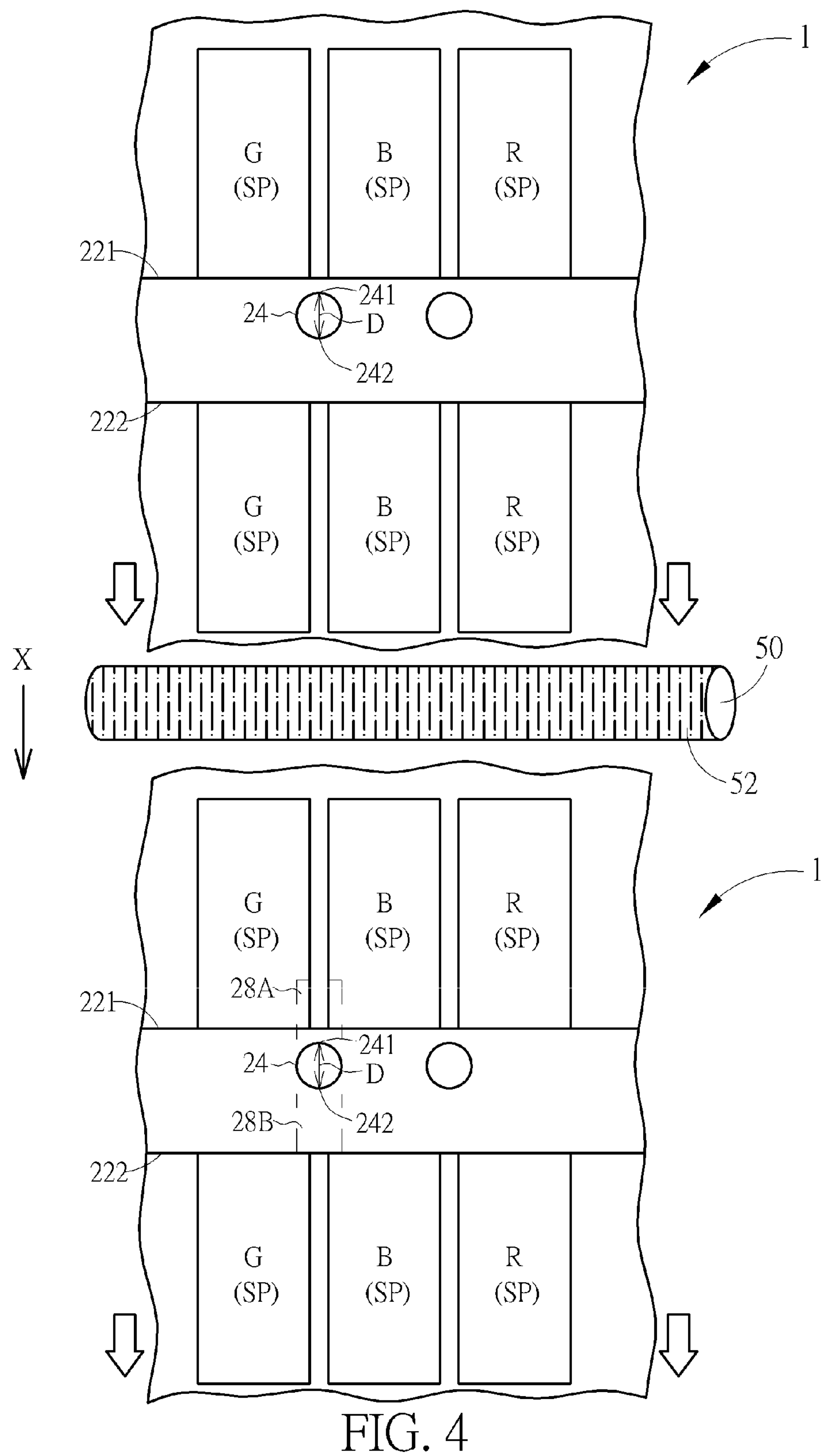
FIG. 4 is a top view schematically illustrating the display panel of this embodiment when performing a rubbing alignment process.
Figure 5:
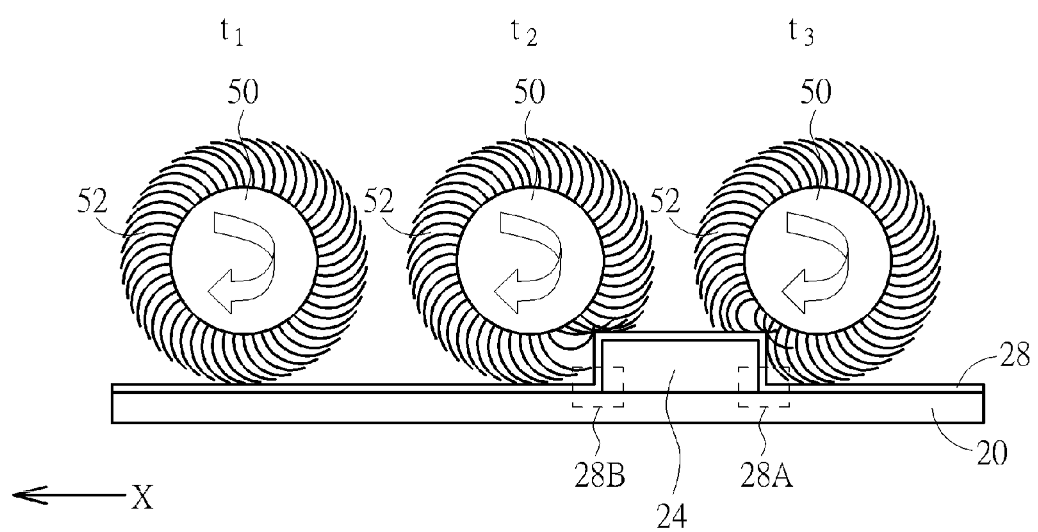
FIG. 5 is a cross-sectional view illustrating the display panel of this embodiment when performing a rubbing alignment process.

Refer to FIGS. 4-5, as well as FIGS. 1-3. FIG. 4 is a top view schematically illustrating the display panel of this embodiment when performing a rubbing alignment process, and FIG. 5 is a cross-sectional view illustrating the display panel of this embodiment when performing a rubbing alignment process. As shown in FIGS. 4-5, in order to provide the alignment film 28 with aligning effect, the display panel 1 is moved along a rubbing direction X, and a roller 50 with a brush 52 is used to rub the alignment film 28. During the rubbing alignment process, the roller 50 is immobilized and self-rotated e.g. clockwise at one side of the display panel 1. The brush 52 is disposed on the roller 50 at an angle of 60 degrees, for example, and the display panel 1 is moved along the rubbing direction X. As shown in FIG. 5, at a first time point t1, the brush 52 of the roller 50 is in contact with the surface of the alignment film 28 to form an alignment pattern on the surface of the alignment film 28. At a second time point t2, since the roller 50 is rotated clockwise, a dead space between the spacer 24 and the brush 52 will exist when the spacer 24 approaches the roller 50. Due to the dead space, the brush 52 of the roller 50 is not able to completely contact the second rim 242 of the spacer 24, and thus the alignment film 28 corresponding to the second edge 222 of the light-shielding pattern 22 cannot be perfectly rubbed and aligned. Consequently, this region forms a weak alignment region 28B. At the third time point t3, since the roller 50 is rotated clockwise, when the display panel 1 continues to move along the rubbing direction X to the first rim 241 of the spacer 24, the brush 52 of the roller 50 is able to completely contact the first rim 241 of the spacer 24. Thus, the alignment film 28 corresponding to the first edge 221 of the light-shielding pattern 22 can be perfectly rubbed and aligned, and this region forms a strong alignment region 28A.

As shown in FIGS. 1-3, the alignment effect of the weak alignment region 20B is inferior to the alignment effect of the strong alignment region 28A, and thus the display media e.g. liquid crystal molecules corresponding to the weak alignment region 28B are not well aligned, which causes light leakage. Consequently, in order to diminish the light leakage in the weak alignment region 28B, the position of the spacer 24 is shifted toward the strong alignment region 28A to make the weak alignment region 28B overlap the light-shielding pattern 22 in the vertical projection direction Z as much as possible. Accordingly, the light leakage can be shielded by the light-shielding pattern 22 without increasing the area of the light-shielding pattern 22. In another aspect, since the strong alignment region 28A has good alignment effect, no light leakage will occur even when the strong alignment region 28A is shifted toward the display region without being partially or entirely shielded by the light-shielding pattern 22 in the vertical projection direction Z. As long as the spacer 24 overlaps the light-shielding pattern 22 in the vertical projection direction Z, the aperture ratio is not affected. Specifically, each spacer 24 has a first rim 241 facing the first edge 221, and a second rim 242 facing the second edge 222. A first distance A" exists between the first rim 241 and the first edge 221, and a second distance B" exists between the second rim 242 and the second edge 222. The width H, the diameter D, the first distance A" and the second distance B" satisfy the following relations:

$$B''>0;$$

$$A''\geq 0;$$

$$B''>A''; \text{ and}$$

$$2D\leq H\leq 3D.$$

Under the above conditions, the spacer 24 is shifted along the second direction D2 without crossing the boundary of the light-shielding pattern 22, and the weak alignment region 28B is disposed within the boundary of the light-shielding pattern 22. Consequently, the light leakage in the weak alignment region 28B is shielded by the light-shielding pattern 22. It is experimentally proved that the shifting design of the spacers 24 of the display panel 1 reduces about 26% of dark state brightness of a dark image and increases about 17.8% of contrast ratio compared to a display panel of a control embodiment in which the spacers are disposed symmetrically, i.e. the spacer is disposed at a symmetric center of four adjacent sub-pixels.

The display panel is not limited by the aforementioned embodiment, and may have other different preferred embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 6:
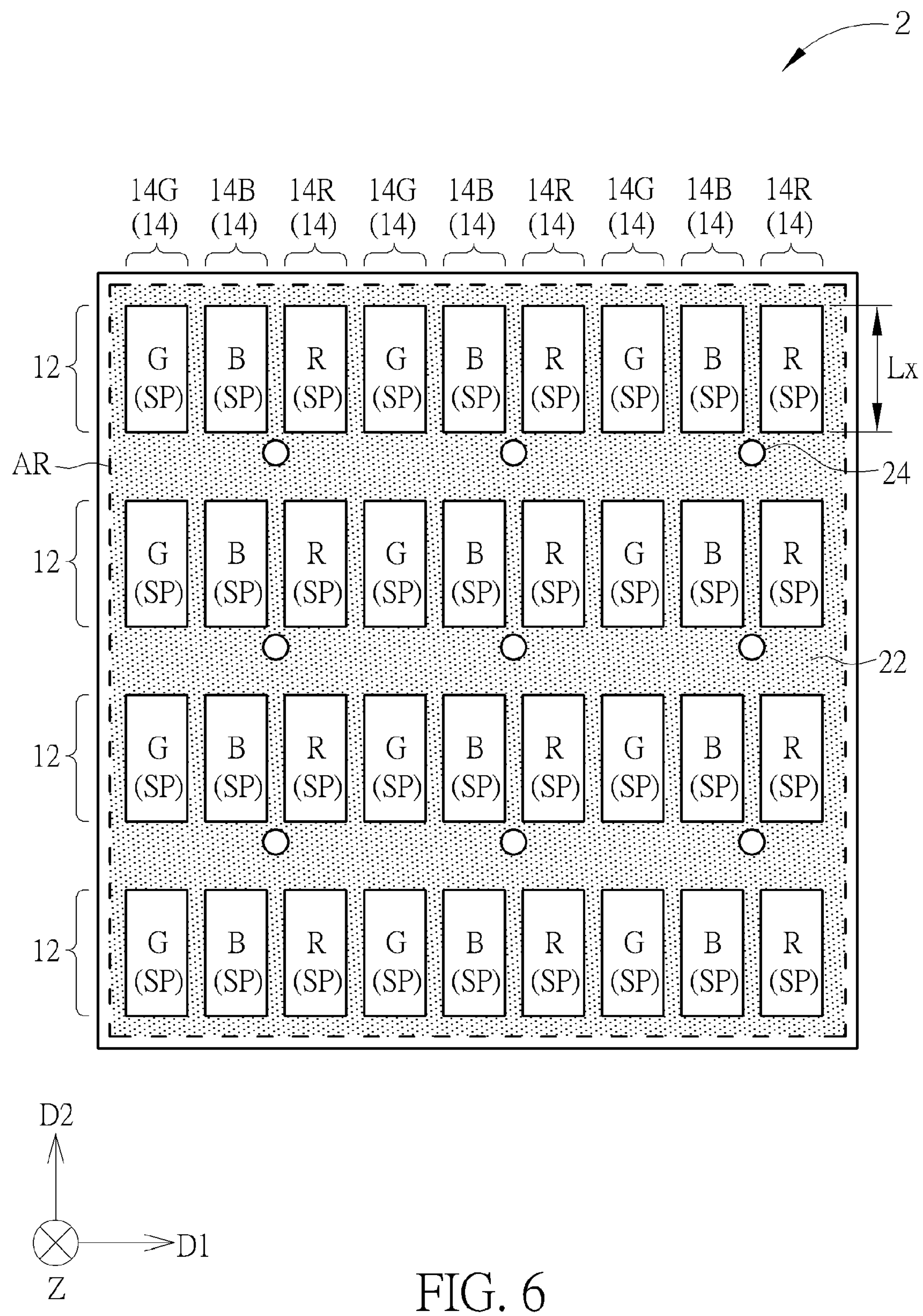
FIG. 6 is a schematic diagram illustrating a display panel according to a second embodiment of the present invention.
Figure 7:
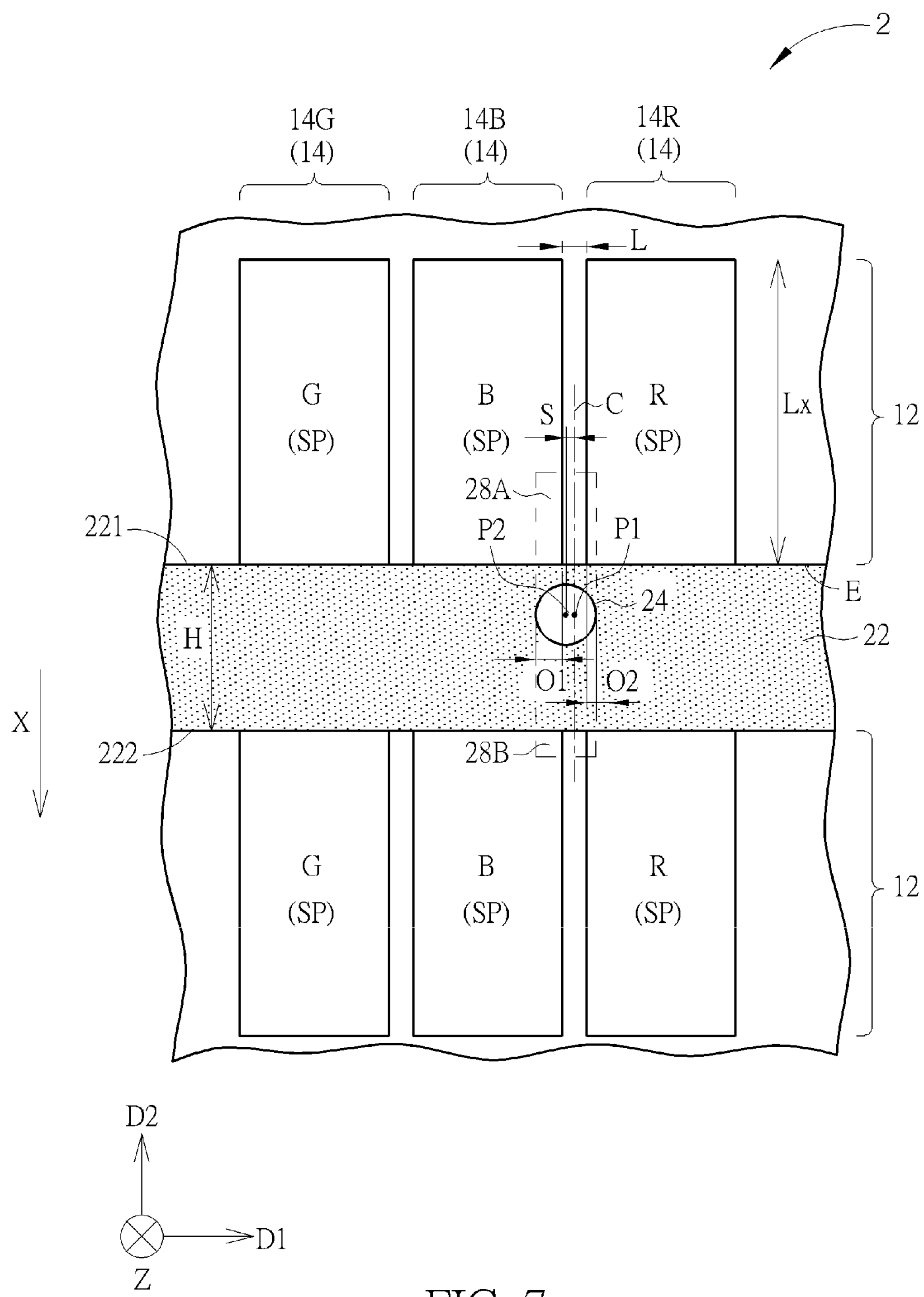
FIG. 7 is a partially enlarged view of the display panel of FIG. 6.
Figure 8:
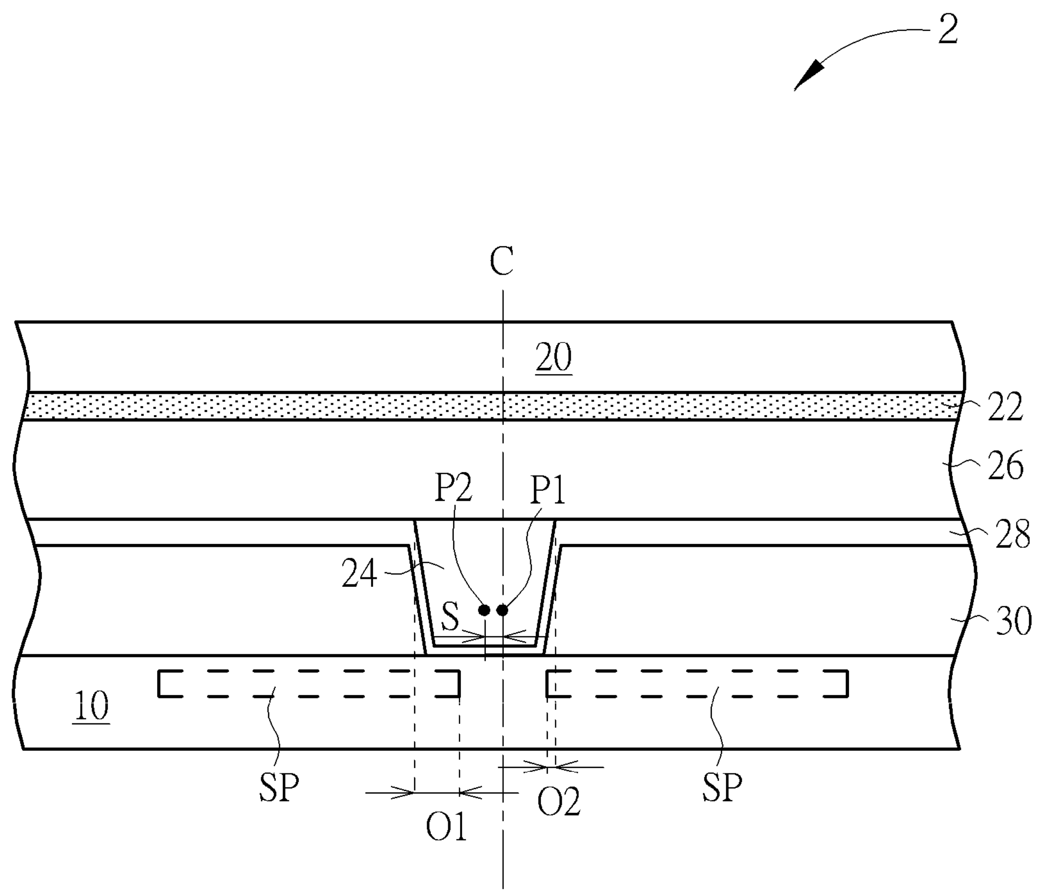
FIG. 8 is a cross-sectional view of the display panel according to the second embodiment of the present invention.

Refer to FIGS. 6-8. FIG. 6 is a schematic diagram illustrating a display panel according to a second embodiment of the present invention, FIG. 7 is a partially enlarged view of the display panel of FIG. 6, and FIG. 8 is a cross-sectional view of the display panel according to the second embodiment of the present invention, where some components are not drawn in all of the drawings for highlighting the features of the display panel. As shown in FIGS. 6-8, in the display panel 2 of this embodiment, the spacers 24 may be shifted in the second direction D2 toward the strong alignment region 28A as described in the first embodiment. In this embodiment, the spacers 24 may also be shifted in the first direction D1. Specifically, the spacers 24 are disposed between the blue sub-pixel column 14B and the red sub-pixel column 14R disposed adjoining to the blue sub-pixel column 14B; the spacers 24 are not disposed between the blue sub-pixel column 14B and the green sub-pixel column 14G disposed adjoining to the blue sub-pixel column 14B, and the spacers 24 are not disposed between the green sub-pixel column 14G and the red sub-pixel column 14R disposed adjoining to the green sub-pixel column 14G, but not limited thereto. In addition, there is a central reference line (also referred to as a central base line) C between the blue sub-pixel column 14B and the red sub-pixel column 14R disposed adjoining to the blue sub-pixel column 14B. The distance between the central reference line C and the adjoining blue sub-pixel column 14B in the first direction D1 is substantially equal to the distance between the central reference line C and the adjoining red sub-pixel column 14R, and a gap L exists between the blue sub-pixel column 14B and the red sub-pixel column 14R in the first direction D1. Furthermore, there is a first position P1 in the central reference line C. Each of the spacers 24 is shifted from the first position P1 toward the blue sub-pixel column 14B to be disposed at a second position P2, an offset S exists between the first position P1 and the second position P2, and the offset S, the gap L and the diameter D satisfy the following relation: $S\geq 0.5(D-L)$. Also, each of the sub-pixels SP has a side E substantially parallel to the first direction D1, and each of the spacers 24 is disposed between the sides E of two adjoining sub-pixels SP (e.g. blue sub-pixels B) of the corresponding blue sub-pixel column 14B. In this embodiment, each of the spacers 24 partially overlaps the side E of the sub-pixel SP (e.g. blue sub-pixel B) of the corresponding blue sub-pixel column 14B in the second direction D2, and an overlapping portion of the spacer 24 and the side E of the sub-pixel SP (e.g. blue sub-pixel B) of the corresponding blue sub-pixel column 14B has a first overlapping length O1 in the first direction D1. Each of the spacers 24 is disposed between the sides E of two adjoining sub-pixels (e.g. red sub-pixels R) of the corresponding red sub-pixel column 14R, each of the spacers 24 partially overlaps the side E of the sub-pixel (e.g. red sub-pixel R) of the corresponding red sub-pixel column 14R in the second direction D2, an overlapping portion of the spacer 24 and the side E of the sub-pixel SP (e.g. red sub-pixel R) of the corresponding red sub-pixel column 14R has a second overlapping length O2 in the first direction D1, and the first overlapping length O1 is greater than the second overlapping length O2. In other words, the spacer 24 is shifted from the first position P1 toward the blue sub-pixel column 14B to be disposed at the second position P2, but the spacer 24 still partially overlaps the blue sub-pixel B and the red sub-pixel R respectively in the second direction D2.

Since the spacer 24 is shifted from the first position P1 toward the blue sub-pixel column 14B to the second position P2, the weak alignment region 28B is shifted toward the blue sub-pixel B as well so that the light leakage in the blue sub-pixel B is more than the light leakage in the red sub-pixel R. In other words, without increasing the area of the light-shielding pattern 22, the weak alignment region 28B is shifted toward the blue sub-pixel B and away from the red sub-pixel R, and thus the light leakage in the blue sub-pixel B is more than the light leakage in the red sub-pixel R. Normally, the brightness of red light is higher than the brightness of blue light, and thus the light leakage in the blue sub-pixel B is less significant and less noticeable than the light leakage in the red sub-pixel R. Accordingly, the dark state brightness of a dark image can be reduced. In this embodiment, the spacers 24 may be only the sub spacers, only the main spacers or a combination of main spacers and sub spacers.

Figure 9:
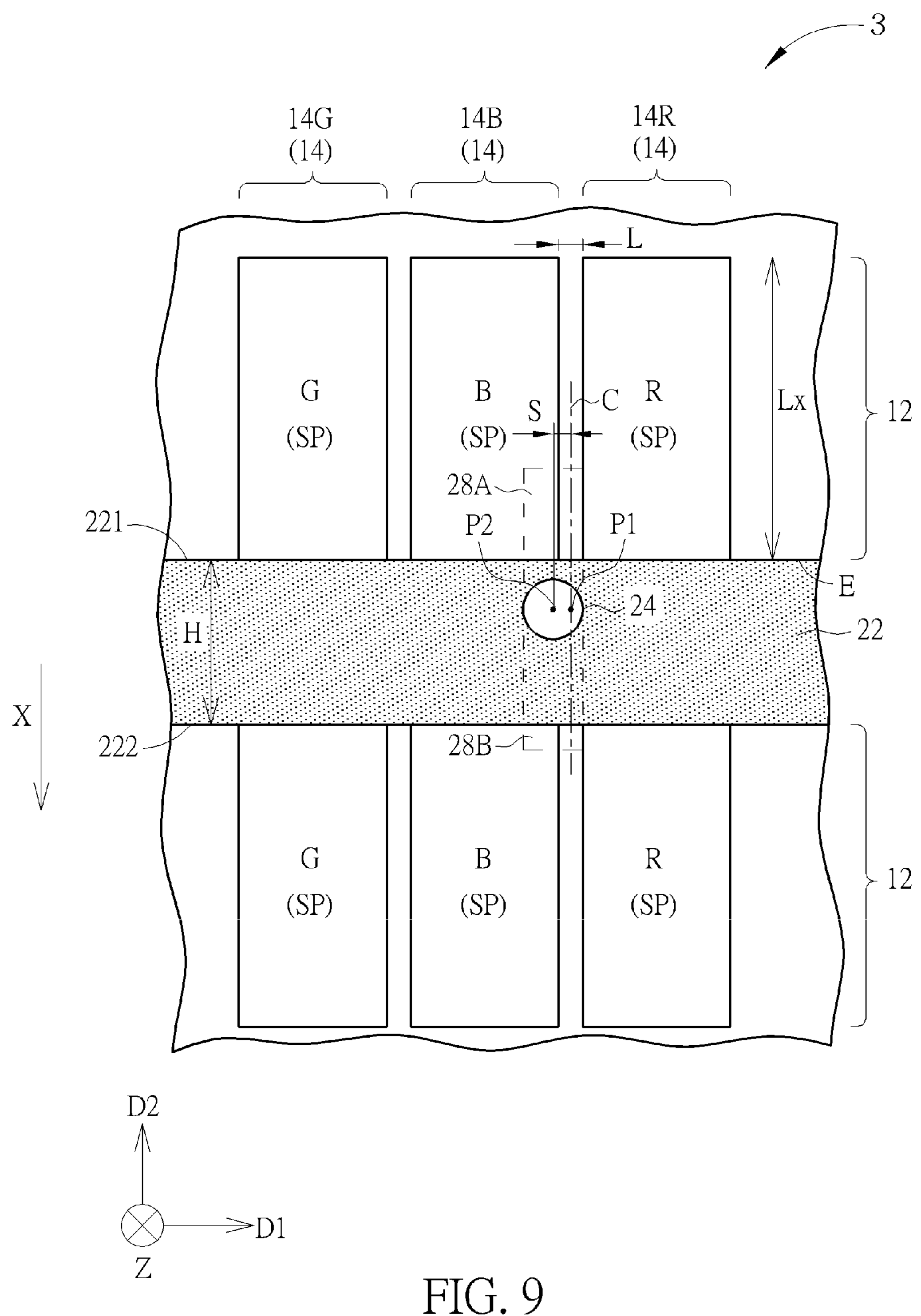
FIG. 9 is a partially enlarged view of a display panel according to an alternative embodiment of the second embodiment of the present invention.
Figure 10:
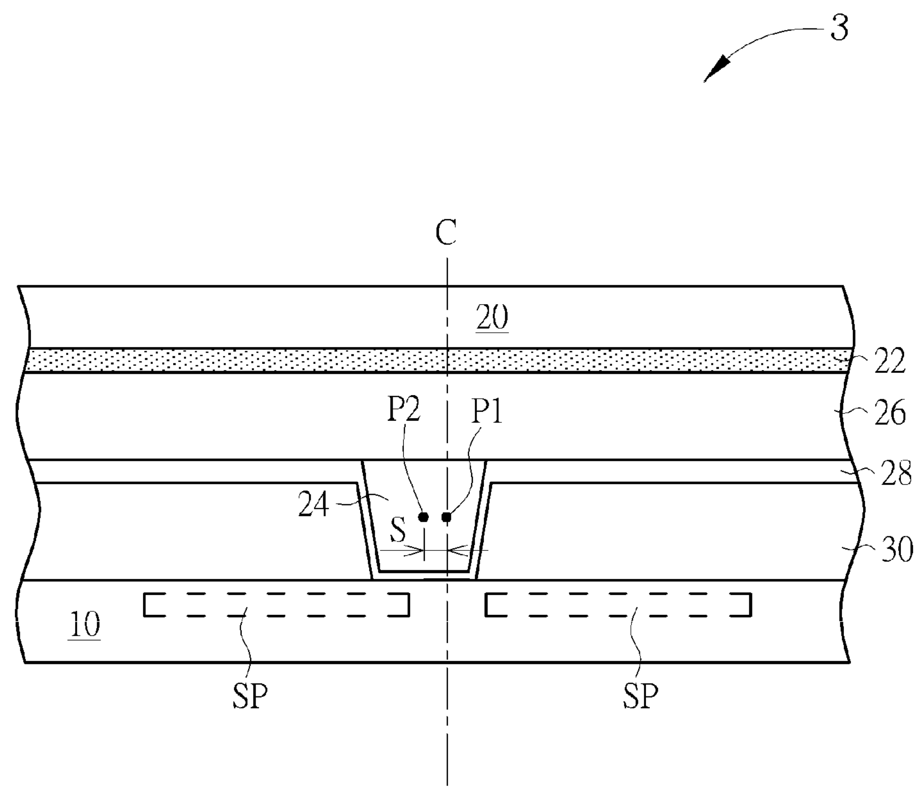
FIG. 10 is a cross-sectional view of the display panel according to the alternative embodiment of the second embodiment of the present invention.

Refer to FIGS. 9-10. FIG. 9 is a partially enlarged view of a display panel according to an alternative embodiment of the second embodiment of the present invention, and FIG. 10 is a cross-sectional view of the display panel according to the alternative embodiment of the second embodiment of the present invention. As shown in FIGS. 9-10, in the display panel 3 of this alternative embodiment, each of the spacers 24 is shifted from the first position P1 toward the blue sub-pixel column 14B to the second position P2, where an offset S exists between the first position P1 and the second position P2, and the offset S, the gap L and the diameter D satisfy the following relation: $S \geq 0.5(D-L)$. Different from the second embodiment, in this alternative embodiment, each of the spacers 24 partially overlaps the side E of the sub-pixel SP (e.g. blue sub-pixel B) of the corresponding blue sub-pixel column 14B in the second direction D2, but each of the spacers 24 does not overlap the side E of the sub-pixel SP (red sub-pixel R) of the corresponding red sub-pixel column 14R in the second direction D2. In this alternative embodiment, the spacers 24 may be only the sub spacers, only the main spacers or a combination of main spacers and sub spacers.

In conclusion, the spacer of the display panel of the present invention is shifted to make the weak alignment region overlap the light-shielding pattern without reducing the aperture ratio since the area of the light-shielding pattern is unchanged. Thus, the dark state brightness of a dark image is reduced, and the contrast ratio is increased. In addition, the spacer of the display panel of the present invention is shifted toward the sub-pixel with specific color (e.g. blue sub-pixel), and thus the dark state brightness of a dark image is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel, comprising:

a pixel array comprising a plurality of sub-pixels, wherein the sub-pixels are substantially arranged along a first direction to form a plurality of sub-pixel rows, and substantially arranged along a second direction to form a plurality of sub-pixel columns;

a light-shielding pattern, disposed between any two adjacent sub-pixel rows, wherein the light-shielding pattern has a first edge and a second edge, the first edge and the second edge are disposed adjoining to the two adjacent sub-pixel rows respectively, and a width H exists between the first edge and the second edge in the second direction; and a plurality of spacers, disposed between the two adjacent sub-pixel rows, the spacers overlap the light-shielding pattern in a vertical projection direction, wherein each of the spacers has a diameter D, each of the spacers has a first rim facing the first edge and a second rim facing the second edge, a first distance A" exists between the first rim and the first edge, a second distance B" exists between the second rim and the second edge, and the width H, the diameter D, the first distance A" and the second distance B" satisfy the following relations:

$$B''>0;$$

$$A''\geq 0;$$

$$B''>A''; \text{ and}$$

$$2D\leq H\leq 3D.$$

2. The display panel of claim 1, wherein each of the spacers is a cylinder structure.

3. The display panel of claim 1, further comprising an alignment film disposed on each of the spacers, wherein a portion of the alignment film corresponding to the first rim of each of the spacers and the first edge of the light-shielding pattern is a strong alignment region, and a portion of the alignment film corresponding to the second rim of each of the spacers and the second edge of the light-shielding pattern is a weak alignment region.

4. The display panel of claim 1, wherein the sub-pixel columns comprise a plurality of green sub-pixel columns, a plurality of blue sub-pixel columns and a plurality of red sub-pixel columns arranged alternately.

5. The display panel of claim 4, wherein there is a central reference line between the blue sub-pixel column and the red sub-pixel column disposed adjoining to the blue sub-pixel column, a distance between the central reference line and the adjoining blue sub-pixel column in the first direction is substantially equal to a distance between the central reference line and the adjoining red sub-pixel column, and a gap L exists between the blue sub-pixel column and the red sub-pixel column in the first direction.

6. The display panel of claim 5, wherein there is a first position in the central reference line, each of the spacers is shifted from the first position toward the blue sub-pixel column to a second position, an offset S exists between the first position and the second position, and the offset S, the gap L and the diameter D satisfy the following relation: $S\geq 0.5(D-L)$.

7. The display panel of claim 6, wherein each of the sub-pixels has a side substantially parallel to the first direction, each of the spacers is disposed between the sides of two adjoining sub-pixels of the corresponding blue sub-pixel column, each of the spacers partially overlaps the side of the sub-pixel of the corresponding blue sub-pixel column in the second direction, and an overlapping portion of the spacer and the side of the sub-pixel of the corresponding blue sub-pixel column has a first overlapping length in the first direction.

8. The display panel of claim 7, wherein each of the spacers is disposed between the sides of two adjoining sub-pixels of the corresponding red sub-pixel column, each of the spacers partially overlaps the side of the sub-pixel of the corresponding red sub-pixel column in the second direction, an overlapping portion of the spacer and the side of the sub-pixel of the corresponding red sub-pixel column has a second overlapping length in the first direction, and the first overlapping length is greater than the second overlapping length.

9. The display panel of claim 6, wherein each of the spacers does not overlap the side of the sub-pixel of the corresponding red sub-pixel column in the second direction.

10. The display panel of claim 6, wherein the spacers are disposed between the blue sub-pixel column and the red sub-pixel column disposed adjoining to the blue sub-pixel column.

11. The display panel of claim 10, wherein the spacers are not disposed between the blue sub-pixel column and the green sub-pixel column disposed adjoining to the blue sub-pixel column, and the spacers are not disposed between the green sub-pixel column and the red sub-pixel column disposed adjoining to the green sub-pixel column.

12. The display panel of claim 1, wherein the first direction and the second direction are substantially perpendicularly to each other.

* * * * *